United States Patent
Sato et al.

(10) Patent No.: US 7,619,195 B2
(45) Date of Patent: Nov. 17, 2009

(54) IMAGING DEVICE DRIVER, IMAGING DEVICE DRIVING METHOD, AND IMAGE SIGNAL PROCESSOR

(75) Inventors: Koichi Sato, Saitama (JP); Akifumi Tabata, Ibaraki (JP)

(73) Assignee: HOYA Corporation, Tokyo (JP)

( * ) Notice: Subject to any disclaimer, the term of this patent is extended or adjusted under 35 U.S.C. 154(b) by 153 days.

(21) Appl. No.: 11/553,499

(22) Filed: Oct. 27, 2006

(65) Prior Publication Data
US 2007/0096011 A1    May 3, 2007

(30) Foreign Application Priority Data
Oct. 28, 2005    (JP)    ............................ P2005-314115

(51) Int. Cl.
*H01J 27/00*    (2006.01)
(52) U.S. Cl. ................................. 250/208.1; 348/218.1
(58) Field of Classification Search .............. 250/208.1; 348/282, 297, 298, 218.1
See application file for complete search history.

(56) References Cited

U.S. PATENT DOCUMENTS

| | | | |
|---|---|---|---|
| 6,992,714 B1 | 1/2006 | Hashimoto et al. | 348/273 |
| 7,030,738 B2* | 4/2006 | Ishii | 340/425.5 |
| 2001/0030700 A1* | 10/2001 | Mabuchi et al. | 348/302 |
| 2003/0227552 A1* | 12/2003 | Watanabe | 348/220.1 |
| 2005/0141047 A1* | 6/2005 | Watanabe | 358/471 |
| 2006/0038893 A1* | 2/2006 | Knoedgen et al. | 348/222.1 |
| 2006/0126081 A1* | 6/2006 | Watanabe et al. | 358/1.2 |
| 2006/0158537 A1* | 7/2006 | Watanabe | 348/272 |
| 2006/0165283 A1* | 7/2006 | DeWitt et al. | 382/173 |

FOREIGN PATENT DOCUMENTS

JP    2001-036920    2/2001

OTHER PUBLICATIONS

U.S. Appl. No. 11/550,535 to Sato et al., filed Oct. 18, 2006.

* cited by examiner

*Primary Examiner*—Georgia Y Epps
*Assistant Examiner*—Kevin Wyatt
(74) *Attorney, Agent, or Firm*—Greenblum & Bernstein PLC (57) ABSTRACT

An imaging device driver that drives an imaging device, comprising a controller, is provided. The imaging device has the light receiving surface divided into a plurality of pixel blocks. Each pixel block has a plurality of pixels. The pixel generates a pixel signal according to received light amount. The imaging device generates an image signal. The image signal is formed by a plurality of the pixel signals. The image signal corresponds to an optical image of an object during a single frame period. The controller causes the pixel located at a first and a second area in the pixel block to generate the pixel signal in a first and a second frame period, respectively, if the imaging device is driven to output the image signal while thinning out the pixel signals. The second frame period follows the first frame period.

15 Claims, 8 Drawing Sheets

IMAGING DEVICE DRIVER, IMAGING DEVICE DRIVING METHOD, AND IMAGE SIGNAL PROCESSOR

BACKGROUND OF THE INVENTION

1. Field of the Invention

The present invention relates to an imaging device driver that drives an imaging device while thinning out pixel signals, an imaging device driving method while thinning out pixel signals, and an image signal processor that improves the picture quality of an image corresponding to an image signal generated while thinning out pixel signals.

2. Description of the Related Art

A digital camera, the imaging device of which has a number of pixels and that can capture both a static image and a dynamic image, is known. When a dynamic image is captured by such a digital camera, some pixel signals are thinned out at an imaging device.

By thinning out pixel signals, one frame of an image signal can be output quickly without shortening the time to generate and outputting each pixel signal. The quick output prevents the motion resolution from decreasing. On the other hand, some problems associated with degrading picture quality, such as a fake pattern and a moire, happen because of lack of information in the optical image at thinned out pixels caused by thinning out the pixel signals.

As for the problems regarding the moire caused by thinning out, Japanese Patent Publication No. 2001-36920 discloses adding pixel signals generated by neighboring pixels and outputting the added pixel signals from the imaging device. In this way, a fake pattern and a moire are prevented from happening, However, an imaging device designed for such a special use is necessary for carrying out adding the pixel signals. On the other hand, an all-purpose imaging device cannot have such a function.

SUMMARY OF THE INVENTION

Therefore, an object of the present invention is to provide an imaging device driver and an imaging device driving method that enables an all-purpose imaging device to generate an image signal of which the motion resolution is kept at a high level, and by which the generation of a fake pattern or a moire is prevented. In addition, an object of the present invention is to provide an image signal processor that carries out signal processing for the image signal, generated according to above an imaging device driver or method, so as to decrease the generation of the fake pattern and the moire.

According to the present invention, an imaging device driver that drives an imaging device, comprising a controller, is provided. The imaging device has the light receiving surface divided into a plurality of pixel blocks. Each pixel block has a plurality of pixels. Each pixel generates a pixel signal according to a received light amount. The imaging device generates an image signal formed by a plurality of the pixel signal. The image signal corresponds to an optical image of an object during a signal frame period. The controller causes the pixels located at first and second areas in the pixel block to generate the pixel signals in a first and a second frame period, respectively, in case that the imaging device is driven to output the image signal while thinning out the pixel signals. The second frame period follows the first frame period.

According to the present invention, an image signal processor comprising a signal receiver and an addition block is provided. The signal receiver receives a pixel signal from an imaging device. The imaging device has the light receiving surface divided into a plurality of pixel blocks Each pixel block has a plurality of pixels. Each pixel generates a pixel signal according to a received light amount. The imaging device generates an image signal. The image signal is formed by a plurality of the pixel signals corresponding to an optical image of an object. The pixels located at first and second areas in the pixel block generate the pixel signals in a first and a second frame period, respectively, in case that the imaging device is driven to output the image signal while thinning out the pixel signals. The addition block adds up the pixel signals generated by the pixel located at the first and the second area in the first and the second frame periods.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings.

Figure 1:
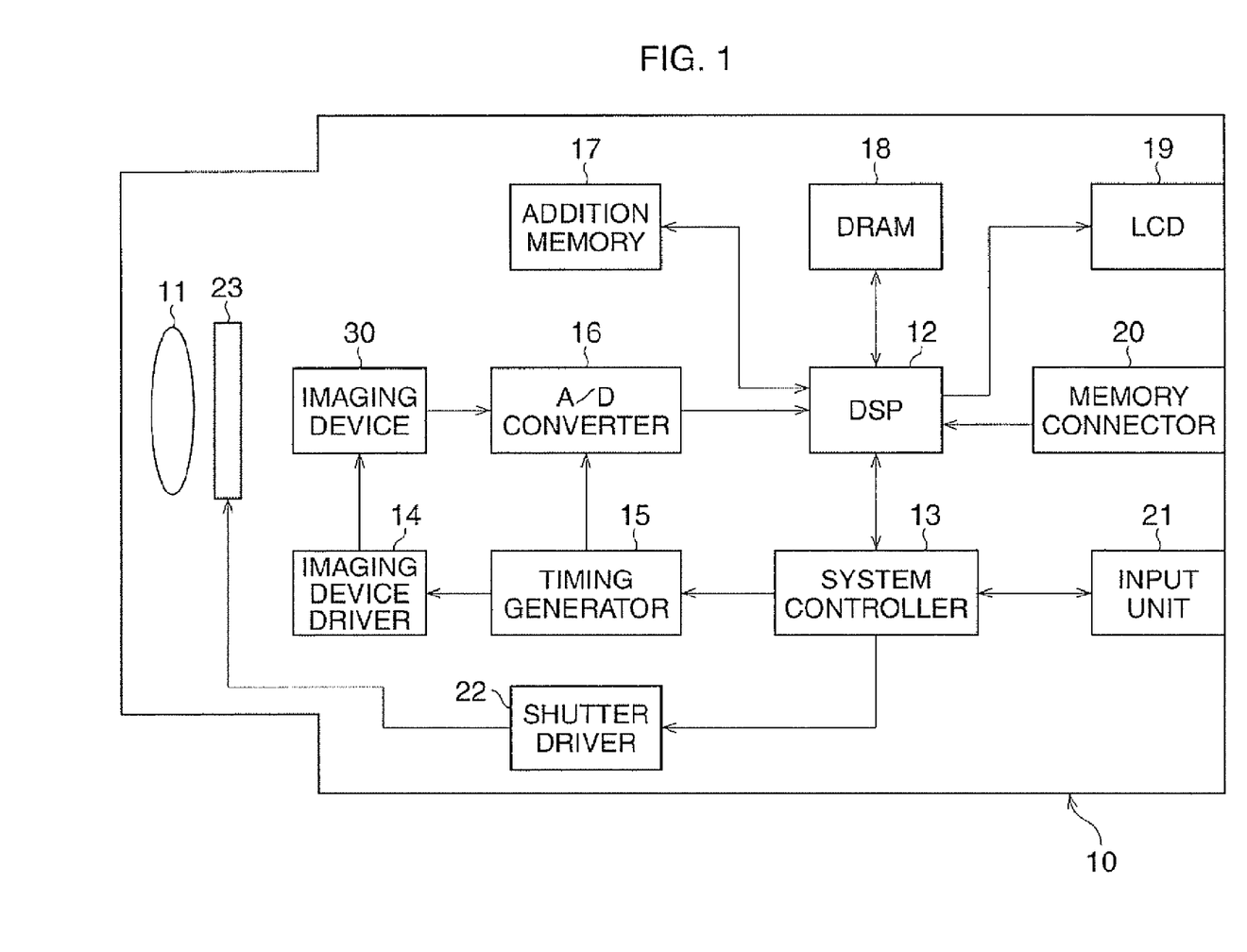
FIG. 1 is a block diagram showing the internal structure of a digital camera having an imaging device driver and signal processor of a first embodiment of the present invention.

FIG. 1 is a block diagram showing the internal structure of a digital camera having an imaging device driver and signal processor of a first embodiment of the present invention.

In FIG. 1, a digital camera 10 comprises a lens 11, an imaging device 30, a digital signal processor (DSP) 12, a system controller 13, an imaging device driver 14, a timing generator 15, and other components.

The lens 11 is optically connected to the imaging device 30. An optical image of an object through the lens 11 is incident to the light-receiving surface of the imaging device 30. The imaging device 30 is a CMOS imaging device. When the imaging device 30 captures the optical image of the object, the imaging device 30 generates image signal(s) corresponding to the optical image.

The image signals generated by the imaging device 30 are sent to the A/D converter 16. The image signals, which are analog signals, are converted into digital signal by the A/D converter 16. The image signals, after being converted into digital signals, are sent to the DSP 12.

The DSP 12 is connected to the addition memory 17 and to the DRAM 18. The addition memory 17 is used as a work memory for signal processing upon capturing a dynamic image. The DRAM 18 is used as a work memory for signal processing on capturing both a dynamic and static images. The image signals, after being sent to the DSP 12, are stored by the DRAM 18. The DSP 12 carries out some predetermined signal processing for the image signals stored by the DRAM 18.

The image signals, having undergone the predetermined signal processing, are sent to an LCD 19. An image, corresponding to the image signals sent to the LCD 19, is displayed on the LCD 19. Further, the image signals, having undergone the predetermined signal processing, can be stored on a memory card (not depicted), which is connected to the DSP 12 via a memory connector 20. The memory card can be connected to or disconnected from the memory connector 20 as necessary.

The system controller 13 controls the entire operation of the digital camera 10. The system controller 13 is connected to an input unit 21, comprising shutter button (not depicted), and control dial (not depicted) for a user to enter a command. Commands from the user entered into the input unit 21 are sent to the system controller 13 as command signals. The system controller 13 controls the operation of the components in the digital camera 10 according to the command signal. For example, when the shutter button is fully pushed, the system controller 13 controls a shutter driver 22 so that a shutter 23 mounted between the lens 11 and the imaging device 30 is opened and closed. Then, an optical image of an object is captured by the imaging device 30.

Further, the system controller 13 controls the timing generator 15 so that each component of the digital camera carries out a predetermined operation at a predetermined timing The timing generator 15 is connected to an imaging device driver 14. The imaging device driver 14 drives the imaging device 30 according to the control of the timing generator 15. When the shutter button is fully pushed, the imaging device driver 14 causes the imaging device 30 to generate an image signal corresponding to the captured optical image.

The digital camera 10 has a static image mode and a dynamic image mode. The mode is changed by the control dial. In the static image mode, a static image is shot. In the dynamic image mode, a dynamic image is shot. In the dynamic image mode, the imaging device driver 14 drives the imaging device 30 according to a different driving method from that in the static image mode. In addition, in the dynamic image mode, the DSP 12 carries out an addition process, described later, for the image signal in addition to the predetermined signal processing for the static image mode.

Next, the structure of the imaging device 30 is explained with reference to FIG. 2.

Figure 2:
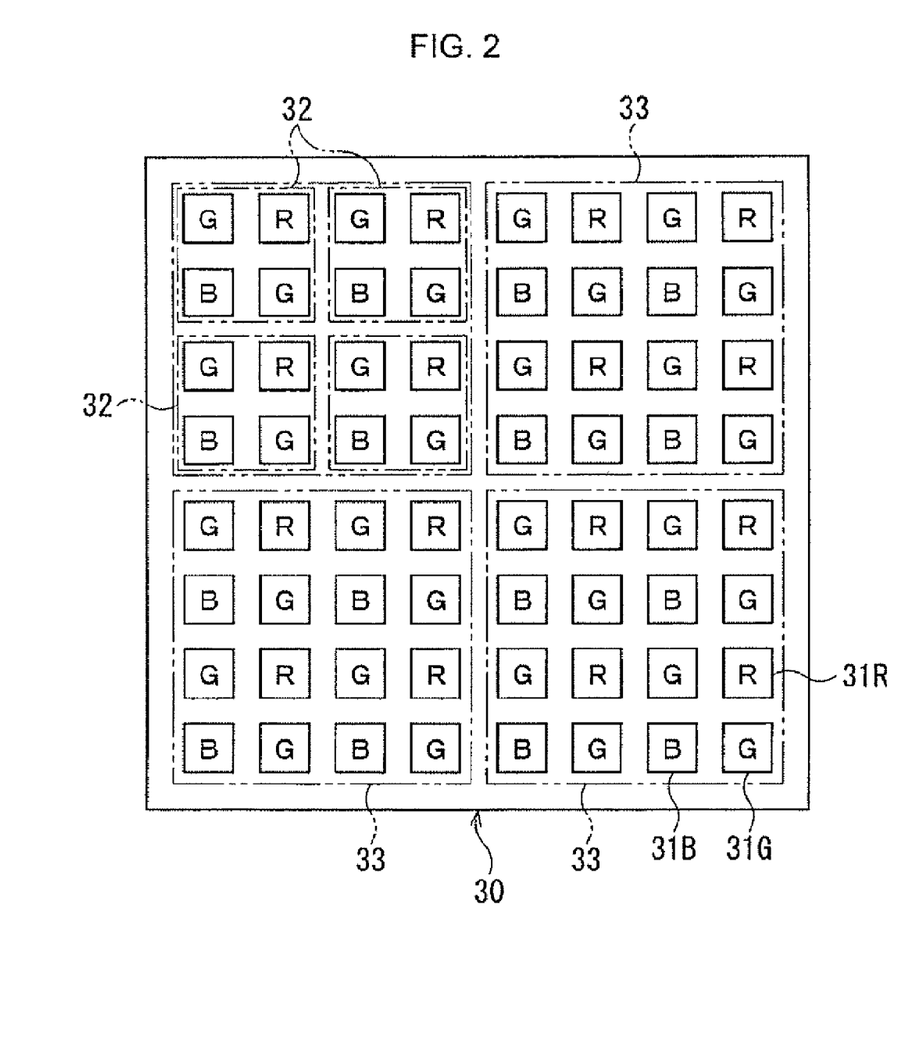
FIG. 2 illustrates a front view of an imaging device to explain the structure of a receiving surface of an imaging device.

As shown in FIG. 2, a plurality of pixels 31R, 31G, and 31B are arranged at the light-receiving surface in a matrix. In this embodiment, the pixels form 8 rows and 8 columns at the light-receiving surface of the imaging device 30. A first pixel 31R is covered by a red color filter element. The first pixel 31R generates a pixel signal according to the amount of red light received at the first pixel 31R. A second pixel 31G is covered by a green color filter element. The second pixel 31G generates a pixel signal according to the amount of green light received at the second pixel 31G. A third pixel 31B is covered by a blue color filter element. The third pixel 31B generates a pixel signal according to the amount of blue light received at the third pixel 31B.

The first, second, and third pixels are arranged according to the Bayer color array. Accordingly, one first pixel 31R, two second pixels 31G, and one third pixel 31B form one color array unit 32. In addition, color array units 32 of 2 rows and 2 columns form one pixel block 33. Consequently, the light-receiving surface of the imaging device 30 is divided into a plurality of pixel blocks 33, where 16 pixels of 4 rows and 4 columns are arranged.

Pixel signals, generated by a plurality of pixels 31R, 31G, and 31B, the location of which in the light-receiving surface are different form one image signal during one frame period. In other words, pixel signals are generated during one frame period and output from each pixel 31R, 31G, and 31B separately. Incidentally, the frame period is a period when an image signal corresponding to a single image displayed on the LCD 19 is generated.

In the static image mode, all pixels 31R, 31G, and 31B on the light-receiving surface generate pixel signals at an optional shutter speed. Each of the pixel signals is sent to the DSP 12 in order. As described above, the predetermined signal processing is carried out for each of the sent pixel signals.

On the other hand, in the dynamic image mode, the imaging device driver 14 drives the imaging device 30 so that pixel signals are generated by one part of the pixels on the light-receiving surface during one frame period which can be, (for example, 1/60 second), and then, the thinning out of the pixel signals is carried out.

During a frame period in the dynamic image mode, pixel signals are generated by and output from four pixels in the color array units 32, arranged at a predetermined location in each pixel block 33. The predetermined location is changed according to the frame period.

Figure 3:
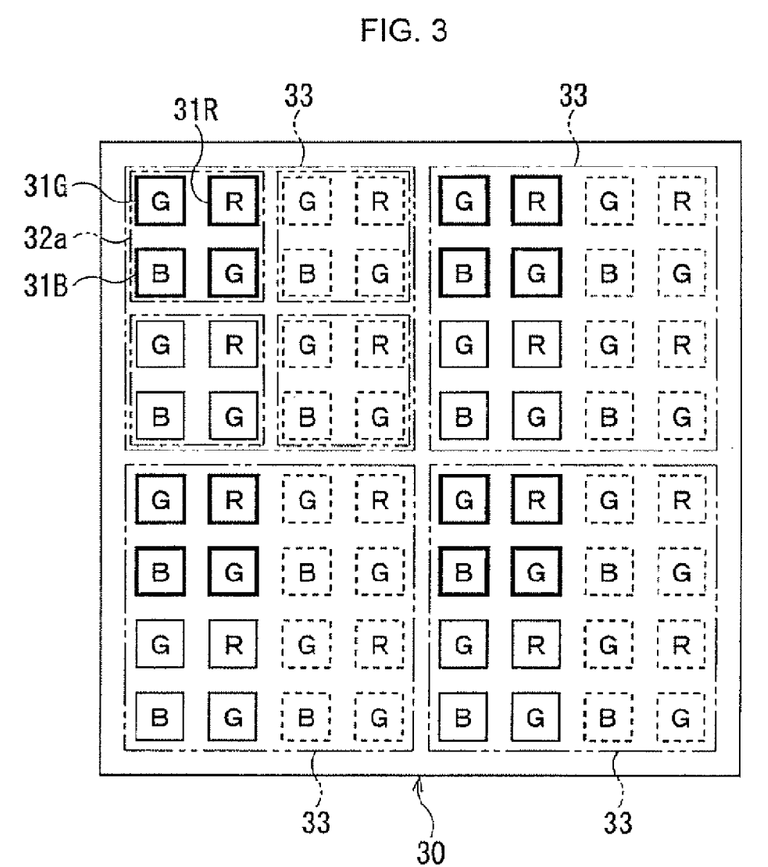
FIG. 3 illustrates a front view of an imaging device to explain a location of a first color array unit in a pixel block.

During a first frame period, pixel signals are generated by and output from the first, the second, and the third pixels 31R, 31G, and 31B in the first color array units 32a arranged at the upper left location in each pixel block 33 (see the bold outlines in FIG. 3).

Figure 4:
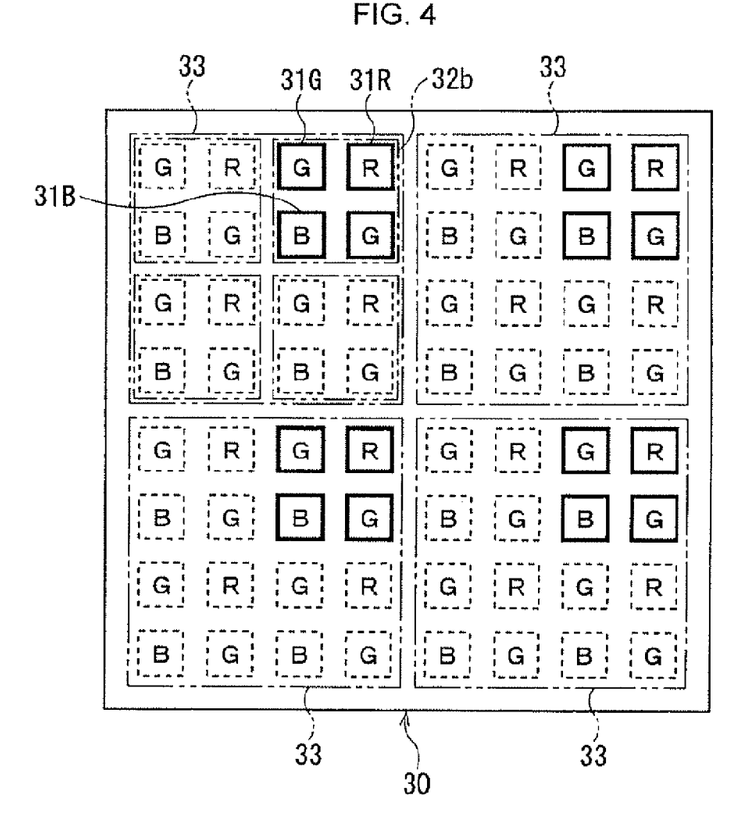
FIG. 4 illustrates a front view of an imaging device to explain a location of a second color array unit in a pixel block.

During a second frame period after the first frame period, pixel signals are generated by and output from the first, the second, and the third pixels 31R, 31G, and 31B in the second color array units 32b arranged at the upper right location in each pixel block 33 (see the bold outlines in FIG. 4).

Figure 5:
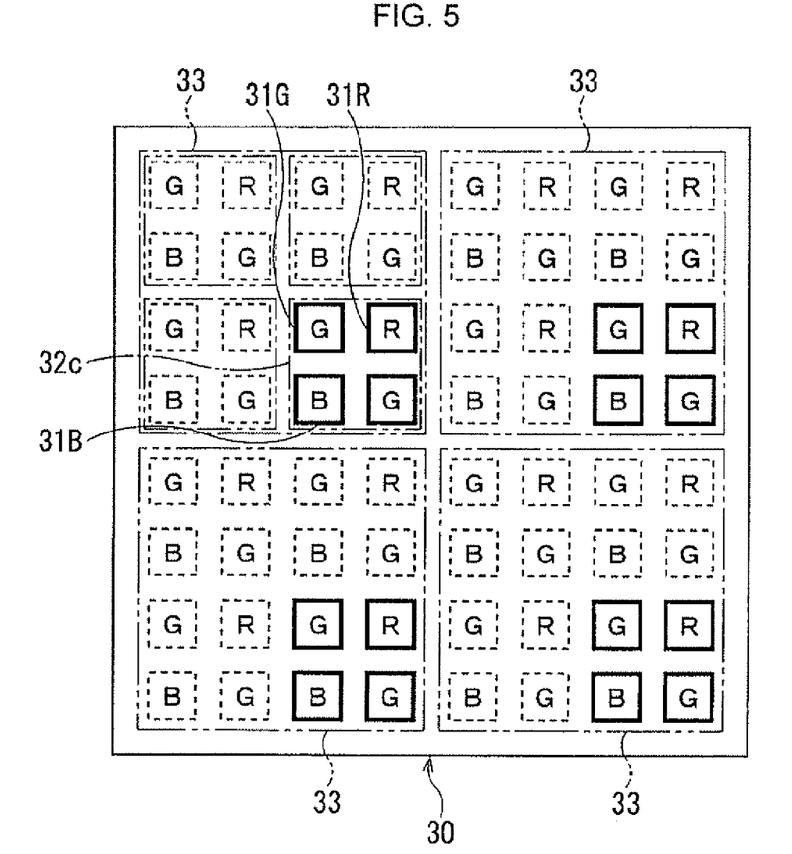
FIG. 5 illustrates a front view of an imaging device to explain a location of a third color array unit in a pixel block.

During a third frame period after the second frame period, pixel signals are generated by and output from the first, the second, and the third pixels 31R, 31G, and 31B in the third color array units 32c arranged at the lower right location in each pixel block 33 (see the bold outlines in FIG. 5).

Figure 6:
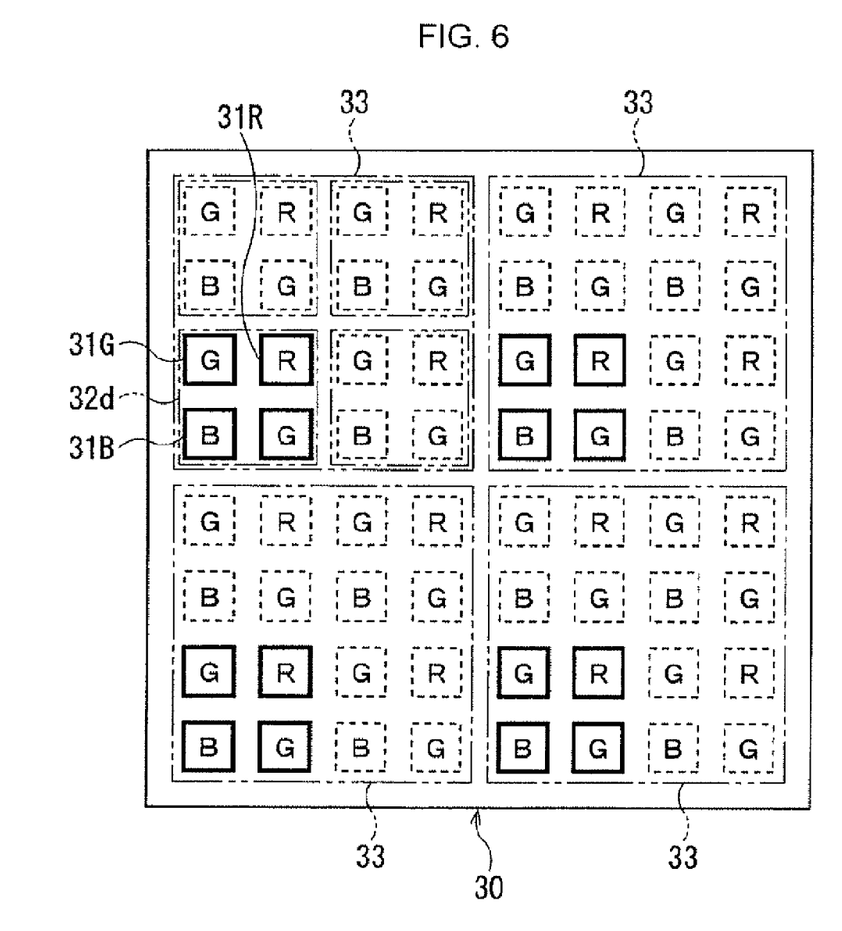
FIG. 6 illustrates a front view of an imaging device to explain a location of a fourth color array unit in a pixel block.

During a fourth frame period after the third frame period, pixel signals are generated by and output from the first, the second, and the third pixels 31R, 31G, and 31B in the fourth color array units 32d arranged at the lower left location in each pixel block 33 (see the bold outlines in FIG. 6).

During the frame period after the fourth frame period, pixel signals are generated by the first, the second, and the third pixels 31R, 31G, and 31B in the first color array units 32a again. After this, pixel signals are generated by pixels in the second, the third, the fourth, the first, . . . color array units 32b, 32c, 32d, 32a, . . . during each frame period.

Next, the addition processing carried out for the pixel signals output during the dynamic image mode described above is described. As described above, the pixel signals, output from the imaging device 30 in the dynamic image mode, are input to the DSP 12 after being converted from an analog signal to a digital signal by the A/D converter 16. The pixel signals, input to the DSP 12, are sent to and stored in the addition memory 17 and the DRAM 18.

Figure 7:
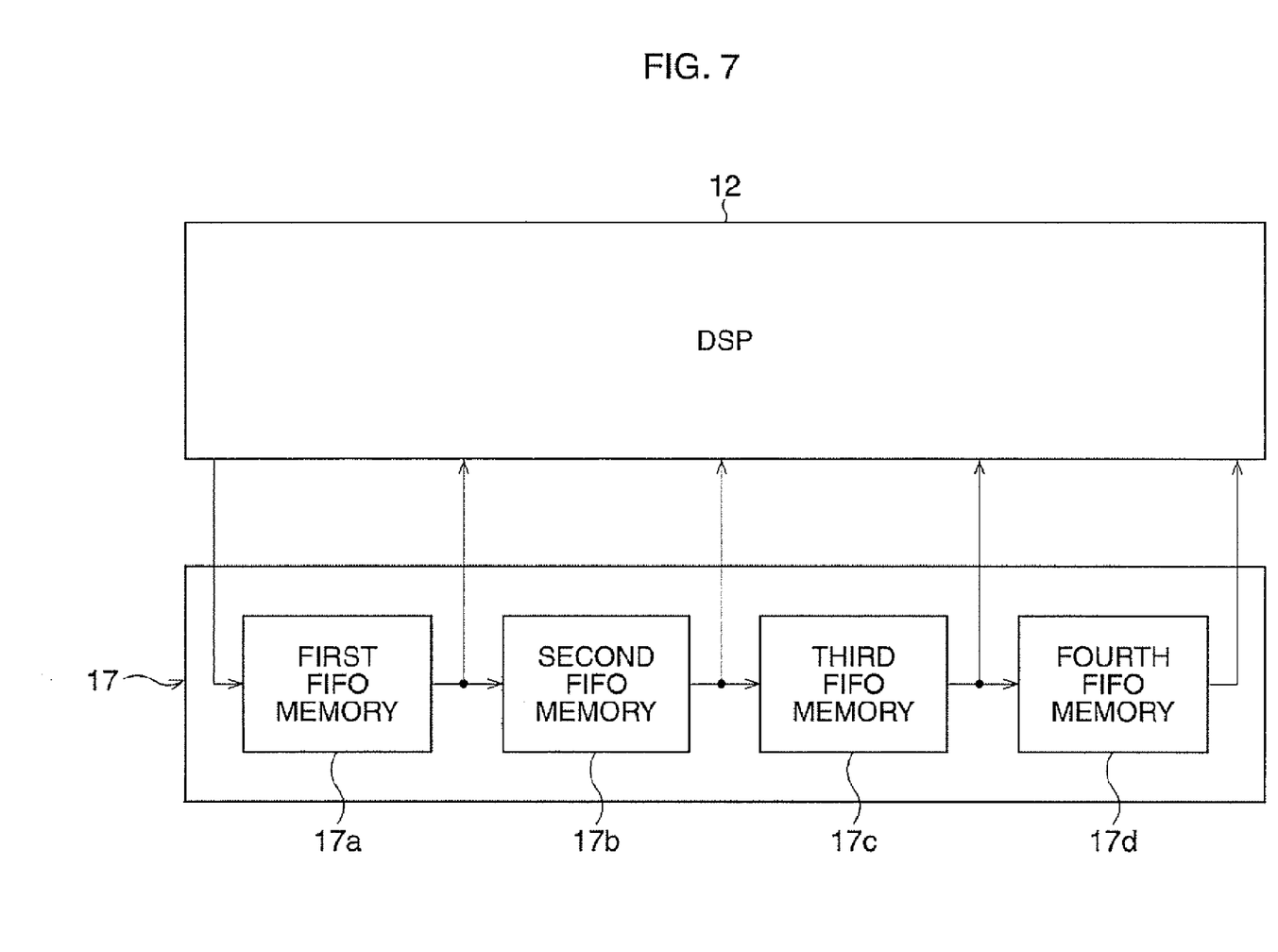
FIG. 7 is a block diagram showing the internal structure of an additional memory.

The internal structure of the addition memory 17 is explained with reference to FIG. 7. The addition memory 17 comprises a first, a second, a third, and a fourth FIFO memory 17a, 17b, 17c, and 17d. Incidentally, FIFO memory outputs the stored signal in the order stored.

The DSP 12 is connected to the input terminal of the first FIFO memory 17a. The pixel signals, sent to the addition memory 17 from the DSP 12, are received by the first FIFO memory 17a. The first, the second, the third, and the fourth FIFO memories 17a, 17b, 17c, and 17d are connected in series. In addition, the output terminals of the first, the second, the third, and the fourth FIFO memories 17a, 17b, 17c, and 17d are connected to the DSP 12.

The pixel signals output from the first FIFO memory 17a are sent to the second FIFO memory 17b and to the DSP 12. The pixel signals output from the second FIFO memory 17b are sent to the third FIFO memory 17c and to the DSP 12. The pixel signals output from the third FIFO memory 17c are sent to the fourth FIFO memory 17d and to the DSP 12. The pixel signals output from the fourth FIFO memory 17a are sent to the DSP 12.

Figure 8:
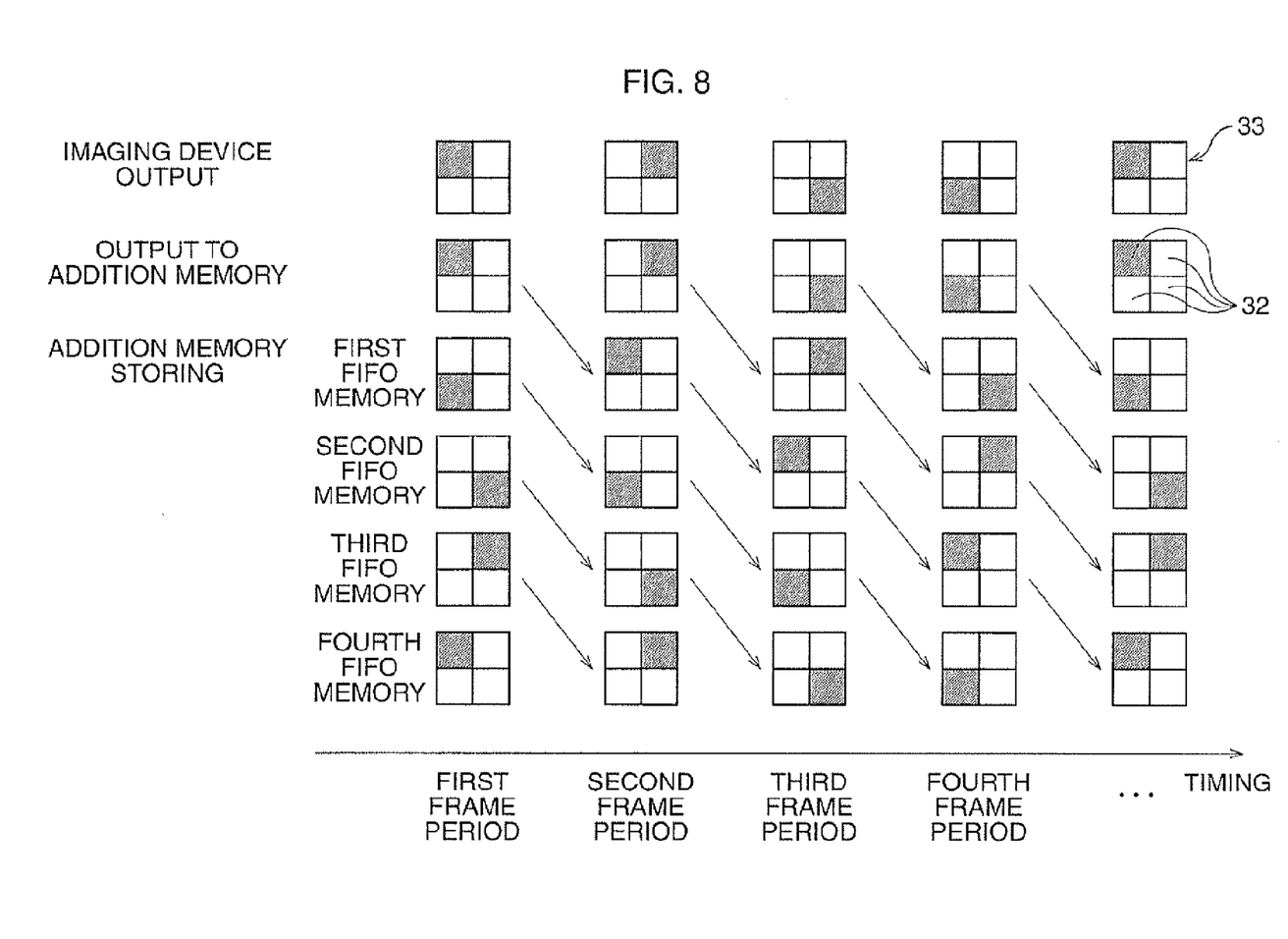
FIG. 8 illustrates a location of the color array unit having pixels that generate pixel signals being output from the imaging device, being received by the addition memory, and being stored in the addition memory in each frame period.

The pixel signals, generated by the pixels arranged in the first color array unit 32a, are output to the first FIFO memory 17a via the DSP 12 for storage during the first frame period (see FIG. 8). When outputting the pixel signals generated by the pixels in the first color array unit 32a to the first FIFO memory 17a, the pixel signals that have been stored in the first FIFO memory 17a during the last frame period, the first before last frame period, the second before last frame period, and the third before last frame period are stored in the first, the second, the third, and the fourth FIFO memories 17a, 17b, 17c, and 17d, respectively.

Accordingly, when outputting the pixel signals generated by the pixels in the first color array unit 32a to the first FIFO memory 17a, the pixel signals that are generated by the pixels arranged in the fourth, the third, the second, and the first color array units 32d, 32c, 32b, and 32a are stored in the first, the second, the third, and the fourth FIFO memories 17a, 17b, 17c, and 17d, respectively (see the shadowed area in the column for the first frame period in FIG. 8).

The pixel signals stored by the first, the second, and the third FIFO memories 17a, 17b, and 17c are output to the second, the third, and the fourth FIFO memories 17b, 17c, and 17d, respectively, at the same time that pixel signals are newly output to the first FIFO memory 17a.

The pixel signals, generated by the pixels arranged in the second color array unit 32b, are output to the first FIFO memory 17a during the second frame period. At the same time, the pixel signals, generated by pixels in the first, the fourth, the third, and the second color array units 32a, 32d, 32c, and 32b, are stored in the first, the second, the third, and the fourth FIFO memories 17a, 17b, 17c, and 17d (see the shadowed area in the column for the second frame period in FIG. 8).

Similarly, the pixel signals, generated by the pixels arranged in the third color array unit 32c, are output to the first FIFO memory 17a during the third frame period. At the same time, the pixel signals, generated by the pixels in the second, the first, the fourth, and the third color array units 32b, 32a, 32d, and 32c, are stored in the first, the second, the third, and the fourth FIFO memories 17a, 17b, 17c, and 17d (see the shadowed area in the column for the third frame period in FIG. 8).

Similarly, the pixel signals, generated by the is pixels arranged in the fourth color array unit 32d, are output to the first FIFO memory 17a during the fourth frame period. At the same time, the pixel signals, generated by the pixels in the third, the second, the first, and the fourth color array units 32c, 32b, 32a, and 32d, are stored in the first, the second, the third, and the fourth FIFO memories 17a, 17b, 17c, and 17d (see the shadowed area in the column for the fourth frame period in FIG. 8).

When the pixel signals are input to the first FIFO memory 17a, the pixel signals, having been stored in the first, the second, the third, and the fourth FIFO memories 17a, 17b, 17c, and 17d, are sent to the DSP 12 also.

Accordingly, the pixel signals, generated the most recently by the pixels arranged in the first, the second, the third, and the fourth color array unit 32a, 32b, 32c, and 32d, are input to the DSP 12 during every frame period.

The DSP 12 adds up the pixel signals output from the first, the second, the third, and the fourth FIFO memories 17a, 17b, 17c, and 17d, and then a block signal, corresponding to an optical image of the pixel block 33, is generated. A predetermined signal processing is carried out for the block signal. The block signal, having undergone the predetermined signal processing, is sent to the LCD 19, and a dynamic image is displayed on the LCD 19.

In the above embodiment, the incidence of moire and fake patterns in a dynamic image can be decreased even while using an all-purpose imaging device. The reason is that the color array unit 32 to output the pixel signals is cyclically changed every frame period, and one block signal is generated by adding up the latest pixel signals in the first, the second, the third, and the fourth color array units 32, resulting in preventing lack of image information while still outputting thinned-out pixel signals.

The dynamic image can be displayed on the LCD 19 with decreased incidence of moire and fake patterns using the imaging device driver 14 and the DSP 12 in the above embodiment. However, the dynamic image with decreased incidence of moire and fake patterns can only be displayed just by using the imaging device driver 14.

Using the imaging device driver 14, the color array unit 32 to output the pixel signals is cyclically changed every frame period, and pixel signals arranged in one of the first, the second, the third, or the fourth color array units 32 are output from the imaging device 30. Then an image, corresponding to an image signal formed by the pixel signals generated by the pixels arranged in one of the color array units 32, is displayed. The color array unit 32 to output pixel signals for displaying an image is changed every frame period which can be, (for example, every 1/60 second). A dynamic image in which lack of image information is unnoticeable can be displayed by changing the color array unit 32. Consequently, dynamic image with decreased incidence of moire and fake patterns can be displayed just by using the imaging device driver 14. Of course, it is preferable, for the purpose of decreasing the incidence of moire and fake patterns, to carry out the above described addition processing.

Pixel signals from all color array units 32 are output in order in the above embodiment. However, pixel signals may also be output from a fractional plurality of the color array units 32, in which case the issue of lack of image information can be reduced more than in the case of outputting pixel signals from only a single color array unit 32. For example, pixel signals may be output from pixels arranged in the first and the third color arrays 32a and 32c alternately and during every frame period as well.

Four color array units 32 of 2 rows and 2 columns form one pixel block 33 in the above embodiment. However, more than 2 color array units 32 may also compose a pixel block 33. For example, the first to the nth color array units 32 may also compose a pixel block 33, and pixel signals from the second to the nth color array units 32 may also be output.

The pixel signals, output from each of the first, the second, the third, and the fourth color array units 32 most recently, are input to and added up by the DSP 12. However, this addition process is not restricted to the most recent pixel signals. Of course, the most recent pixel signals are preferable for preventing a time lag between the time of capturing an optical image and the time of displaying that image.

The pixels are covered with the three primary color filter elements, according to the Bayer color array, and the color array unit 32 is formed in the above embodiment. However, the pixels may also be covered with any other suitable kind of color filter elements, depending on the kind of color array. For example, the pixels may also be covered with four complementary color filter elements, according to a complementary-color-difference line-sequential array.

The imaging device driver 14 drives a color imaging device, the pixels of which are covered with color filter elements, in the above embodiment. However, the imaging device driver 14 may also drive a monochrome imaging device. In the case of driving the monochrome imaging device, a plurality of pixels form a pixel block, a pixel signal is output from a different pixel in the pixel block every frame period, and then the same kind of effect for the above embodiment is achieved.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2005-314115 (filed on Oct. 28, 2005), which is expressly incorporated herein, by reference, in its entirety.

The invention claimed is:

1. An image signal processor for processing an image signal generated by an imaging device, the image signal comprising a plurality of pixel signals and the imaging device including a light receiving surface that is divided into a plurality of pixel blocks with each pixel block being divided into a first area, a second area, a third area, and a fourth area with each area being one of an upper left quadrant, an upper right quadrant, a lower right quadrant, and a lower left quadrant of each pixel block and including at least one pixel that generates one of the pixel signals according to a received light amount, the image signal processor comprising:

a signal receiver that receives the pixel signal generated by each pixel of the first area of each pixel block during a first frame period, receives the pixel signal generated by each pixel of the second area of each pixel block during a second frame period consecutive to the first frame period, receives the pixel signal generated by each pixel of the third area of each pixel block during a third frame period consecutive to the second frame period, and receives the pixel signal generated by each pixel of the fourth area of each pixel block during a fourth frame period consecutive to the third frame period; and a signal adder that adds corresponding signal components of the pixel signals received by the signal receiver and generated by the pixels of the first, second, third, and fourth areas during the first, second, third, and fourth frame periods respectively.

2. The image signal processor according to claim 1, wherein the signal adder adds corresponding signal components of the pixel signals most recently generated by the pixels located at the first, second, third, and fourth areas.

3. The image signal processor according to claim 1, wherein each pixel of the first, second, third, and fourth areas of each pixel block is a pixel array that comprises a first pixel, a second pixel, and a third pixel, the first pixel being covered with a first color filter element, the second pixel being covered with a second color filter element, and the third pixel being covered with a third color filter element, the signal adder adds corresponding signal components of pixel signals generated by the first pixel located at the first, second, third and fourth areas of each pixel block during the first, second, third, and fourth frame periods, respectively, the signal adder adds corresponding signal components of pixel signals generated by the second pixel located at the first, second, third, and fourth areas of each pixel block during the first, second, third, and fourth frame periods, respectively, and the signal adder adds corresponding signal components of pixel signals generated by the third pixel located at the first, second, third and fourth areas of each pixel block during the first, second, third, and fourth frame periods, respectively.

4. The image signal processor according to claim 1, wherein the first area is the upper left quadrant of each pixel block, the second area is the upper right quadrant of each pixel block, the third area is the lower right quadrant of each pixel block, and the fourth area is the lower left quadrant of each pixel block.

5. The image signal processor according to claim 1, wherein the signal receiver receives the pixel signals generated by the first, second, third, and fourth areas during the first, second, third, and fourth frame periods, respectively, when the imaging device is in a first mode for thinning out the pixel signals, and wherein the signal receiver receives the pixel signals generated by the first, second, third, and fourth areas during a single frame period when the imaging device is in a second mode.

6. The image signal processor according to claim 1, wherein the signal receiver receives the pixel signal generated by each pixel of more than one and less than all of the first, second, third, and fourth areas during each of the first, second, third, and fourth frame periods.

7. An image signal processor for processing an image signal generated by an imaging device, the image signal comprising a plurality of pixel signals and the imaging device including a light receiving surface that is divided into a plurality of pixel blocks with each pixel block being divided into a first area, a second area, a third area, and a fourth area with each area being one of an upper left quadrant, an upper right quadrant, a lower right quadrant, and a lower left quadrant of each pixel block and including at least one pixel that generates one of the pixel signals according to a received light amount, the image signal processor comprising:

a signal receiver that receives the pixel signal generated by each pixel of the first area of each pixel block during a first frame period, receives the pixel signal generated by each pixel of the second area of each pixel block during a second frame period consecutive to the first frame period, receives the pixel signal generated by each pixel of the third area of each pixel block during a third frame period consecutive to the second frame period, and receives the pixel signal generated by each pixel of the fourth area of each pixel block during a fourth frame period consecutive to the third frame period ;and a signal adder that adds the pixel signals received by the signal receiver and generated by the pixels of the first, second, third, and fourth areas during the first, second, third, and fourth frame periods, respectively, wherein the pixel signals received by the signal receiver from the imaging device are output by the imaging device without averaging of the pixel signals in each frame period.

8. The image signal processor according to claim 7, wherein the signal adder adds the pixel signals most recently generated by the pixels located at the first, second, third, and fourth areas.

9. The image signal processor according to claim 7, wherein each pixel of the first, second, third, and fourth areas of each pixel block is a pixel array that comprises a first pixel, a second pixel, and a third pixel, the first pixel being covered with a first color filter element, the second pixel being covered with a second color filter element, and the third pixel being covered with a third color filter element, the signal adder adds pixel signals generated by the first pixel located at the first, second, third and fourth areas of each pixel block during the first, second, third, and fourth frame periods, respectively, the signal adder adds pixel signals generated by the second pixel located at the first, second, third and fourth areas of each pixel block during the first, second, third, and fourth frame periods, respectively, and the signal adder adds pixel signals generated by the third pixel located at the first, second, third and fourth areas of each pixel block during the first, second, third, and fourth frame periods, respectively.

10. The image signal processor according to claim 7, wherein the first area is the upper left quadrant of each pixel block, the second area is the upper right quadrant of each pixel block, the third area is the lower right quadrant of each pixel block, and the fourth area is the lower left quadrant of each pixel block.

11. The image signal processor according to claim 7, wherein the signal receiver receives the pixel signals generated by the first, second, third, and fourth areas during the first, second, third, and fourth frame periods, respectively, when the imaging device is in a first mode for thinning out the pixel signals, and wherein the signal receiver receives the pixel signals generated by the first, second, third, and fourth areas during a single frame period when the imaging device is in a second mode.

12. The image signal processor according to claim 7, wherein the signal receiver receives the pixel signal generated by each pixel of more than one and less than all of the first, second, third, and fourth areas during each of the first, second, third, and fourth frame periods.

13. An image signal processor for processing an image signal generated by an imaging device, the image signal comprising a plurality of pixel signals and the imaging device including a light receiving surface that is divided into a plurality of pixel blocks with each pixel block being divided into a first area, a second area, a third area, and a fourth area with each area being one of an upper left quadrant, an upper right quadrant, a lower right quadrant, and a lower left quadrant of each pixel block and including at least one pixel that generates one of the pixel signals according to a received light amount, the image signal processor comprising:

a signal receiver that receives the pixel signal generated by each pixel of more than one and less than all of the first, second, third, and fourth areas of each pixel block during a first frame period, and receives the pixel signal generated by each pixel of the other of the first, second, third, and fourth areas of each pixel block during at least one of a second frame period consecutive to the first frame period and a third frame period consecutive to the second frame period; and a signal adder that adds corresponding signal components of the pixel signals received by the signal receiver and generated by the pixels of the first, second, third, and fourth areas during the first and second frame periods.

14. The image signal processor according to claim 13, wherein the first area is the upper left quadrant of each pixel block, the second area is the upper right quadrant of each pixel block, the third area is the lower right quadrant of each pixel block, and the fourth area is the lower left quadrant of each pixel block.

15. The image signal processor according to claim 13, wherein the signal receiver receives the pixel signals generated by the first, second, third, and fourth areas during the first and second frame periods when the imaging device is in a first mode for thinning out the pixel signals, and wherein the signal receiver receives the pixel signals generated by the first, second, third, and fourth areas during a single frame period when the imaging device is in a second mode.

* * * * *